Figure 1:
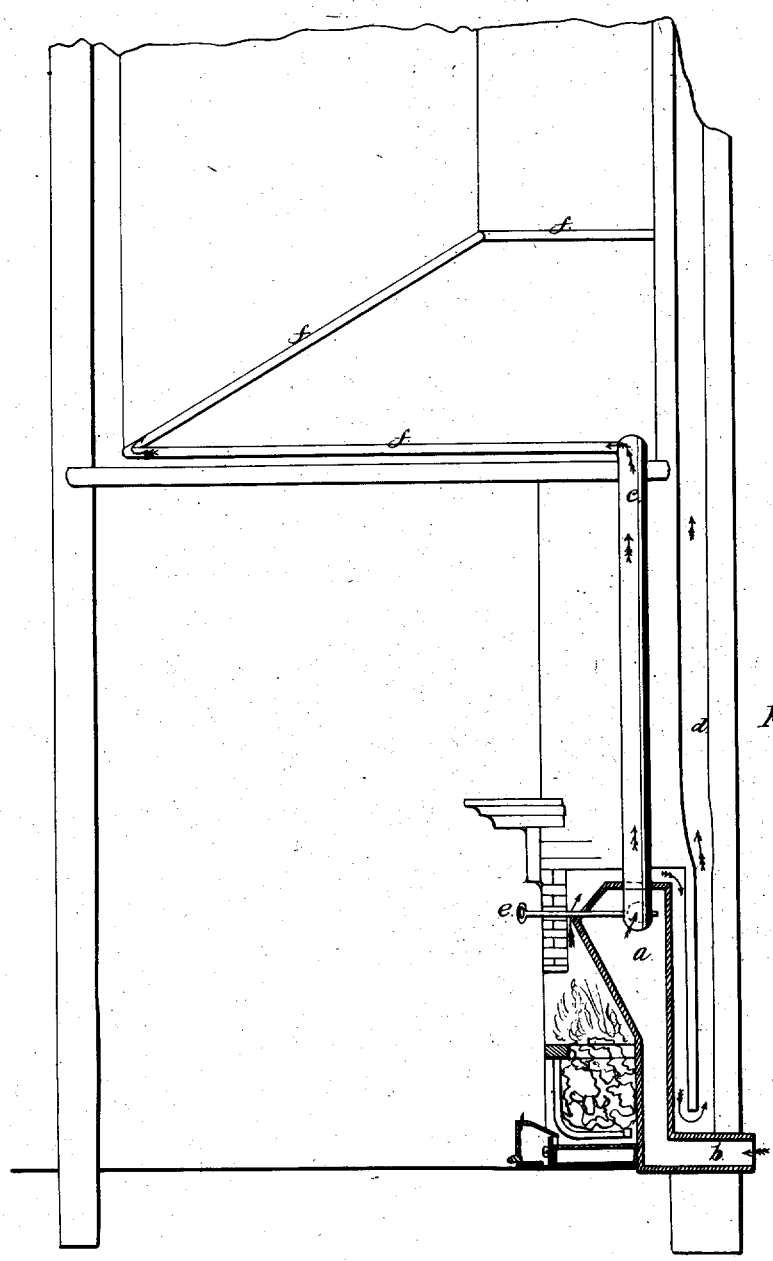

947X

2. Sheets. Sheet 1.

D. Pettibone,

Fire Place.

NO PRINTED SPECIFICATION AVAILABLE

Patented Oct. 28. 1808.

2. Sheets. Sheet. 2.
947X
D. Pettibone,
Fire Place.
Patented Oct. 28. 1808.
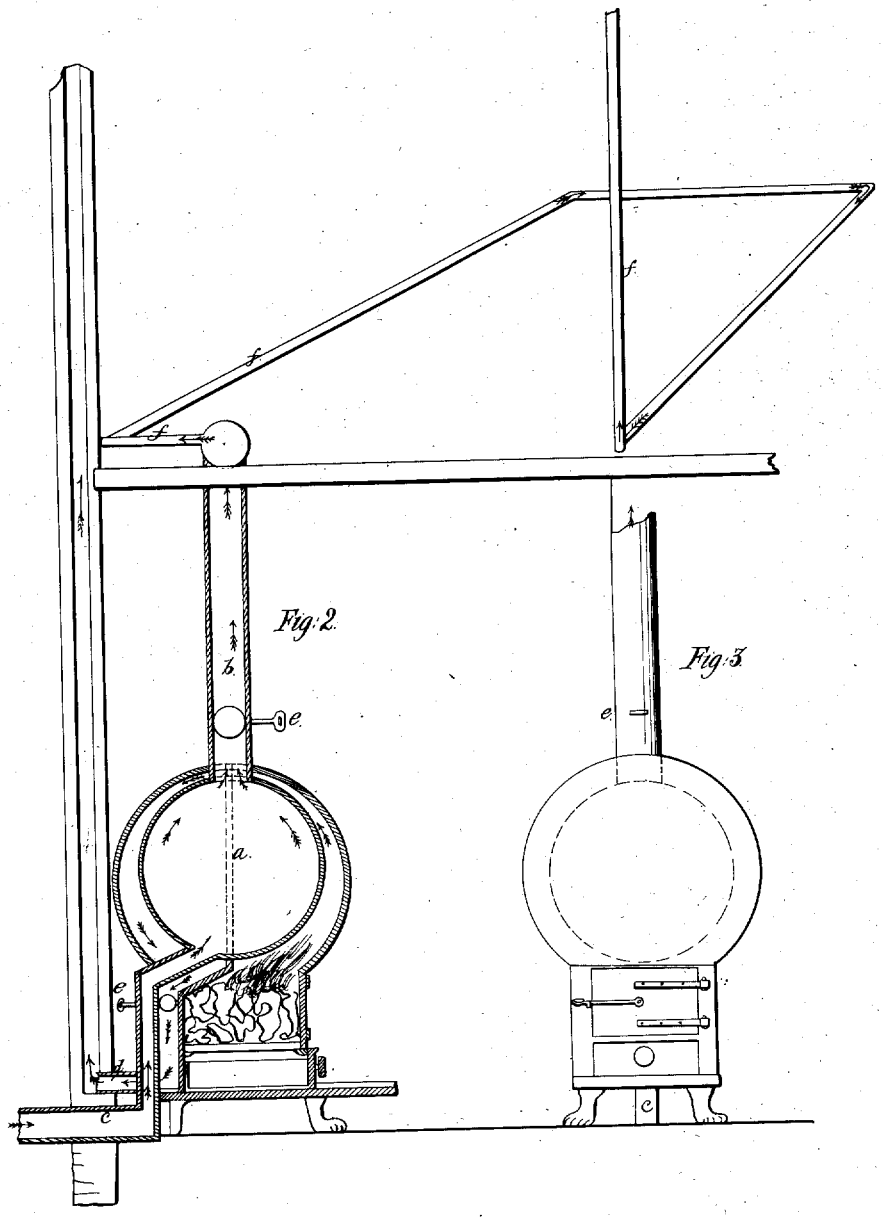

Daniel Pettibone. Letters Patent.

The schedule referred to in these Letters Patent & making part of the same, containing a description in the words of the said Daniel Pettibone himself of his "rarefying air stove."

The invention of this improvement of the rarefying air Stove consists in the construction of a Stove or fire place with a large rarefying air vessel made of cast iron, brick work or other suitable substance with an air pipe to admit the fresh air from the street or yard into said air vessel where it is rarefied & then transmitted by other air pipes fixed into the top of said air vessel into the room or apartment to be warmed. The air vessel rendered perfectly tight so that the smoke cannot enter into it is inclosed in the stove or fire place so that the flame circulates completely round all parts of it. The tube or pipe that conducts the fresh air into said air vessel is fixed in at its bottom, & is of a size much larger than the pipe to transmit the warm air. The said air vessel is fixed inside of the stove or fire place in such a manner that the higher the flame rises in the stove the more intensely the fire operates on it as the inside of the stove gradually approaches from its bottom to its top of the outside surface of said air vessel, & compels the flame to reverberate against it. When the flame & smoke have risen to the top of the stove they are then obliged to descend over a partition in the stove forming a flue with the side of the stove, down as low as the grate of the fire place, & are then carried off into the chimney by a funnel. This construction prevents the heat from escaping into the chimney as it does in common stoves & fire places. The flame may also be made to pass thro' the center of the stove, so as to have the air vessel con-

947X lined between the stove & the brick work or cast iron hop which goes round the stove. The former is preferable. A tube may be fixed up leading from the room to be warmed with rarefied air to the grate of the fire place of the stove so as to supply the fire with a current of air to make it burn, & at the same time draw out of said room the cool air. These tubes or pipes are furnished with valves nigh the stove & are opened & shut by hand in a manner similar to a common brass cock. The tube to convey the warm air has a number of branches, after it has extended from the stove to a proper distance; & these tubes are carried round to various parts of the room & at such distances from the floor as may be found necessary so as to warm all parts of the room alike. Fresh air rarefied in this manner & transmitted into a room will preserve the goodness & elasticity of the air & render the warmth very agreeable & healthy, a circumstance very necessary to people whose business require a good degree of warmth in their rooms & apartments; & especially to people of consumptive constitutions this kind of warmth will be found very congenial & salutary. Stoves made so large as to have air vessels to contain 20, 30 or more gallons of air will be adequate to the warming several rooms or apartments with one fire. These warm air pipes may be made of tin, excepting about 2 feet of them which should be of cast iron, & which go thro' the stove into the air vessel. These tubes ought to be boxed or cased with other tin tubes or with wooden ones so as to prevent the cold air thro' which they pass from cooling them. The stove has doors to the fire place & grate, & also a damper to the funnel so as to regulate the heat & secure the fire. The shape of the stove may be round or square; but the globular form is preferable. A stove of the globular form containing this improvement will produce more heat from the same quantity of fuel than any other shape. With this form the said air vessel as well as the stove itself being made of concave half globes of cast iron with grooved edges to
shut together, can with ease be put together & rendered per-
fectly tight with a little luting made of lime & the white of
eggs put into said grooves when the said vessel & stove are
put together. In this globular stove the said air vessel is fixed
much nigher the top of the stove than any other part of it, so that
the fire is drawn very forcibly against all parts of the surface
of said air vessel; & the smoke is carried down from the top
of the stove by a partition, which is fitted to the concavity of
the stove, & is led out into the funnel as low down as the grate.
A stove of this form with an air vessel not larger than a
common large iron tea kettle will produce a sensible & good
effect. The size however may be as required – The said air
vessel ought to be as large as the magnitude of the stove will
conveniently admit, & the said air pipes made in due proportion
& well luted so as to render said air vessel perfectly air tight,
tubes excepted. These air vessels and tubes may also be fixed
into common chimneys a little above the mantle tree with-
out disfiguring the fire place & will produce a good effect
in warming the room. The same principles of rarefying
air as above laid down may be applied in the construction
of tin lamps or small stoves to be lighted & heated by oil
lamps. In this case the air tubes extend but an inch or
two from the sides of the lamp or stove. These are very
convenient in cases of sickness in the night time.

Witnesses — Daniel Pettibone

John Fairbanks
Zach^a G. Whitman

Exd. W.C.

(1157 words) (Patented October 25. 1808)